(12) United States Patent
Maeda et al.

(10) Patent No.: US 11,214,311 B2
(45) Date of Patent: Jan. 4, 2022

(54) VEHICLE STRUCTURE AND METHOD OF MANUFACTURING VEHICLE

(71) Applicants: TOYOTA JIDOSHA KABUSHIKI KAISHA, Aichi-ken (JP); AISIN KEIKINZOKU CO., LTD., Toyama (JP); AISIN SEIKI KABUSHIKI KAISHA, Aichi-ken (JP)

(72) Inventors: Kazuhisa Maeda, Toyota (JP); Kazutaka Mori, Imizu (JP); Shiho Sugimoto, Kariya (JP)

(73) Assignees: TOYOTA JIDOSHA KABUSHIKI KAISHA, Aichi-Ken (JP); AISIN KEIKINZOKU CO., LTD., Toyama (JP); AISIN SEIKI BUSHIKI KAISHA, Aichi-Ken (JP)

( * ) Notice: Subject to any disclaimer, the term of this patent is extended or adjusted under 35 U.S.C. 154(b) by 84 days.

(21) Appl. No.: 16/848,838

(22) Filed: Apr. 15, 2020

(65) Prior Publication Data

US 2020/0331534 A1 Oct. 22, 2020

(30) Foreign Application Priority Data

Apr. 18, 2019 (JP) .............................. JP2019-079301

(51) Int. Cl.
*B62D 25/02* (2006.01)
*B62D 21/15* (2006.01)
*B62D 27/06* (2006.01)

(52) U.S. Cl.
CPC ............. *B62D 25/02* (2013.01); *B62D 21/15* (2013.01); *B62D 27/06* (2013.01)

(58) Field of Classification Search
CPC ........ B62D 25/02; B62D 21/15; B62D 27/06; B62D 25/08; B62D 21/152; B62D 27/02; B60R 19/34
(Continued)

(56) References Cited

U.S. PATENT DOCUMENTS 9,168,883 B1 * 10/2015 Midoun ............... B62D 21/152
9,701,344 B2 * 7/2017 Kodama ............... B62D 21/152
(Continued)

FOREIGN PATENT DOCUMENTS

JP      H11208393 A    8/1999
JP      2002-114115 A  4/2002
(Continued)

*Primary Examiner* — Pinel E Romain
(74) *Attorney, Agent, or Firm* — Hauptman Ham, LLP (57) ABSTRACT

There is provided a vehicle structure including: left and right side members; left and right impact absorbing members; and mounting members that have: first tubular portions, which are fastened to the side members and the impact absorbing members for a vehicle by first fastening members that are inserted through interiors of the first tubular portions, second tubular portions, which are fastened to the side members and the impact absorbing members for a vehicle by second fastening members that are inserted through interiors of the second tubular portions, and connecting portions, which connect the first tubular portions and the second tubular portions in the vehicle vertical direction and which include vertical wall portions that are plate-shaped and project out further toward an insertion direction side than insertion direction side end surfaces of the impact absorbing members for a vehicle and face or abut end portions of the reinforcing ribs.

6 Claims, 8 Drawing Sheets

(58) Field of Classification Search
USPC .................................................. 296/187.12
See application file for complete search history.

(56) References Cited

U.S. PATENT DOCUMENTS

| | | | |
|---|---|---|---|
| 10,173,728 B2* | 1/2019 | Munjurulimana | ... B62D 21/152 |
| 10,300,873 B2* | 5/2019 | Venkat | ..................... B60R 19/34 |
| 10,464,512 B2* | 11/2019 | Gumpina | ................. B60R 19/18 |
| 10,479,302 B2* | 11/2019 | Kawamura | ............. B60R 19/18 |
| 11,034,316 B2* | 6/2021 | Karlsson | ................. B60R 19/34 |
| 11,097,678 B2* | 8/2021 | Karlsson | ................. B60R 19/34 |
| 2011/0062750 A1* | 3/2011 | Nakaura | ................. B60R 19/12 |
| | | | 296/187.09 |
| 2013/0119682 A1* | 5/2013 | Matuschek | ............. B60R 19/34 |
| | | | 293/133 |
| 2015/0360633 A1* | 12/2015 | Nishida | ................ B62D 25/082 |
| | | | 293/133 |
| 2017/0369013 A1* | 12/2017 | Muralidharan | ......... B60R 19/18 |
| 2018/0100621 A1* | 4/2018 | Tyan | ....................... B32B 5/245 |
| 2018/0265135 A1* | 9/2018 | Komiya | ................. B62D 21/06 |
| 2020/0001930 A1* | 1/2020 | Morisawa | ............... B60R 19/34 |
| 2020/0180535 A1* | 6/2020 | Kito | ........................ C08L 77/06 |
| 2021/0053518 A1* | 2/2021 | Karlsson | ................. B60R 19/34 |
| 2021/0061368 A1* | 3/2021 | Satoh | ..................... B62D 25/08 |

FOREIGN PATENT DOCUMENTS

| | | |
|---|---|---|
| JP | 2004-249789 A | 9/2004 |
| JP | 2008-24084 A | 2/2008 |
| JP | 2012-116254 A | 6/2012 |

* cited by examiner

VEHICLE STRUCTURE AND METHOD OF MANUFACTURING VEHICLE

CROSS-REFERENCE TO RELATED APPLICATION

This application is based on and claims priority under 35 USC 119 from Japanese Patent Application No. 2019-079301 filed on Apr. 18, 2019, the disclosure of which is incorporated by reference herein.

BACKGROUND

Technical Field

The present disclosure relates to a vehicle structure and a method of manufacturing a vehicle.

Related Art

Japanese Patent Application Laid-Open (JP-A) No. 2012-116254 (and FIG. 4 thereof in particular) discloses a mounting structure in which crash boxes that serve as impact absorbing members for a vehicle are mounted to the front end portions or the rear end portions of left and right side members. In the mounting structure disclosed in JP-A No. 2012-116254, tubular members are disposed at two places, one above and one below, so as to span between folded-over/overlapping portions that face one another and are provided at the side member side end portion of the crash box. The crash box is fixed to the side member due to bolts, which are inserted through the interiors of the tubular members, being fastened together with nuts. Due thereto, the compressive load that is applied to the crash box is transmitted also to the tubular members, and therefore, the concentration of stress at the fixed region of the crash box is mitigated. As a result, breakage of the crash box at the fixed region is suppressed, and the collision energy absorbing performance of the crash box itself can be improved.

Integral molding, by extrusion molding, of crash boxes having, at the interiors thereof, reinforcing ribs that extend in the horizontal direction is carried out. In such a case, the reinforcing ribs extend uniformly to the end portion of the crash box. If a crash box of such a structure is mounted to a front side member by the mounting structure disclosed in JP-A No. 2012-116254, it would be desirable, from the standpoint of the efficiency of load transmission, to make the set heights of the reinforcing ribs coincide with the set heights of the tubular members. However, in order to do so, a post-processing of cutting the rear end portions of the reinforcing ribs by cutting machining would have to be added, and the number of manufacturing steps would increase, which would lead to an increase in costs.

Further, even if the set heights of the reinforcing ribs are made to coincide with the set heights of the tubular members, because the tubular members are set independently at two places up and down, it is easy for dispersion to arise in the load inputted to the upper and lower tubular members. Namely, when the rear ends of the reinforcing ribs actually abut the tubular members, if the center line of the rear end of the reinforcing rib (the center line that divides the plate thickness of the rear end into two equal parts) is offset vertically from the axis of the tubular member, the rear end of the reinforcing rib will start to slip along the outer peripheral surface of the tubular member toward the side of the offset. From the opposite standpoint, the tubular member will start to rotate around its axis with respect to the rear end of the reinforcing rib. In this case, loss will arise in the transmitting of the collision load from the crash box to the tubular members, which will not only give rise to incomplete crushing of the crash box, but also, the collision load that is transmitted from the crash box via the tubular members to the front side member will decrease, and the load transmitting performance (and accordingly the load dispersing effect) will deteriorate.

SUMMARY

In view of the above-described circumstances, an object of the present disclosure is to provide a vehicle structure and a method of manufacturing a vehicle that can improve the load transmitting performance from impact absorbing members for a vehicle to side members at the time of a collision, without subjecting reinforcing ribs of the impact absorbing members for a vehicle to post-processing.

A vehicle structure relating to a first aspect includes: a pair of left and right side members that are respectively disposed at both vehicle transverse direction sides of a vehicle front portion and rear portion, and that are formed in shapes of hollow tubes that extend along a vehicle longitudinal direction; a pair of left and right impact absorbing members for a vehicle that are closed cross-sectional structures that extend uniformly along entire lengths thereof along the vehicle longitudinal direction, that have reinforcing ribs that partition the closed cross-sections into a plurality of hollow portions in a vehicle vertical direction, and that have end portions inserted into interiors of distal end portions of the side members; and mounting members that have: first tubular portions, which are disposed within hollow portions that are at vehicle upper sides of the impact absorbing members for a vehicle with length directions being a vehicle transverse direction and which are fastened to the side members and the impact absorbing members for a vehicle by first fastening members that are inserted through interiors of the first tubular portions, second tubular portions, which are provided substantially parallel to the first tubular portions and are disposed within hollow portions that are at vehicle lower sides of the impact absorbing members for a vehicle with length directions being the vehicle transverse direction and which are fastened to the side members and the impact absorbing members for a vehicle by second fastening members that are inserted through interiors of the second tubular portions, and connecting portions, which connect the first tubular portions and the second tubular portions in the vehicle vertical direction and which include vertical wall portions that are plate-shaped and project out further toward an insertion direction side than insertion direction side end surfaces of the impact absorbing members for a vehicle and face or abut end portions of the reinforcing ribs.

In the vehicle structure relating to the first aspect, the pair of left and right side members that are formed in the shapes of hollow tubes are disposed at the vehicle transverse direction both sides of the vehicle front portion and rear portion respectively, and extend along the vehicle longitudinal direction. Further, the end portions of the pair of left and right impact absorbing members for a vehicle are inserted into the interiors of the distal end portions of the corresponding side members. These impact absorbing members for a vehicle are closed cross-sectional structures that extend uniformly along the entire lengths thereof along the vehicle longitudinal direction. The closed cross-sections are partitioned by the plural reinforcing ribs into plural hollow portions in the vehicle vertical direction.

The mounting members are structured to include first tubular portions, second tubular portions, and connecting portions that connect the first tubular portions and the second tubular portions in the vehicle vertical direction. The first tubular portions are disposed in the hollow portions that are at the vehicle upper sides of the impact absorbing members for a vehicle, with the vehicle transverse direction being the length directions of the first tubular portions. The first tubular portions are fastened to the side members and the impact absorbing members for a vehicle by the first fastening members that are inserted-through the interiors of the first tubular portions. The second tubular portions are provided substantially parallel to the first tubular portions, and are disposed in the hollow portions that are at the vehicle lower sides of the impact absorbing members for a vehicle, with the vehicle transverse direction being the length directions of the second tubular portions. The second tubular portions are fastened to the side members and the impact absorbing members for a vehicle by the second fastening members that are inserted-through the interiors of the second tubular portions.

The end portions of the reinforcing ribs of the impact absorbing members for a vehicle face or abut the vertical wall portions of the connecting portions of the mounting members that project-out further toward the insertion direction side than the end surfaces of the impact absorbing members for a vehicle. Therefore, for example, if, in a case in which the impact absorbing members for a vehicle are provided at the side members that are at the vehicle front portion, collision load is inputted to the impact absorbing members for a vehicle from the vehicle front, the rear end portions of the reinforcing ribs are supported by the connecting portions of the mounting members. The first tubular portions and the second tubular portions of the mounting members are connected by the connecting portions and are not independent. Thus, rotation of the tubular members, which arises in a case in which the rear end portions of the reinforcing ribs are supported at tubular members that are set independently of one another at two places above and below as described in JP-A No. 2012-116254, is suppressed or prevented. Therefore, loss of the collision load that is transmitted from the impact absorbing members for a vehicle to the mounting members is suppressed, and a decrease in the collision load that is transmitted from the impact absorbing members for a vehicle via the mounting members to the side members is suppressed. As a result, the load transmitting performance (and accordingly, the load dispersing effect) from the impact absorbing members for a vehicle to the side members improves. Further, because the vertical wall portions of the connecting portions of the mounting members that support the reinforcing ribs project-out further toward the insertion direction side than the end surfaces at the insertion direction sides of the impact absorbing members for a vehicle, there is no need to add a step of a post-processing that cuts, by cutting machining, the insertion direction side end portions of the reinforcing ribs. Due thereto, the load transmitting performance from the impact absorbing members for a vehicle to the side members at the time of a collision can be improved, without subjecting the reinforcing ribs to post-processing.

In a vehicle structure relating to a second aspect, in the first aspect, the first tubular portions and the second tubular portions are disposed further toward inward sides than the end surfaces of the impact absorbing members for a vehicle, and the connecting portions include: the vertical wall portions; first joining portions and second joining portions that project out from the vertical wall portions toward interiors of the closed cross-sections of the impact absorbing members for a vehicle, and join the vertical wall portions and the first tubular portions and the second tubular portions respectively; and projecting portions that are formed integrally with reinforcing rib side surfaces of the vertical wall portions and extend in the vehicle transverse direction.

In the vehicle structure relating to the second aspect, the first tubular portions and the second tubular portions are disposed further toward the inward sides than the insertion direction side end surfaces of the impact absorbing members for a vehicle. Accordingly, the first joining portions, which join the vertical wall portions and the first tubular portions, and the second joining portions, which join the vertical wall portions and the second tubular portions, project-out from the vertical wall portions toward the interiors of the closed cross-sections. Further, the projecting portions are formed integrally with the vertical wall portions at the reinforcing rib side surfaces of the vertical wall portions, and extend in the vehicle transverse direction. Due to the projecting portions being provided at the reinforcing rib side surfaces of the vertical wall portions, if collision load is inputted from the vehicle front to the impact absorbing members for a vehicle, the end portions of the reinforcing ribs that abut the vertical wall portions deform while sliding in the vehicle vertical direction along the vertical wall portions, and anchor on the projecting portions. Due thereto, as compared with a structure in which projecting portions are not provided, large deformation of reinforcing ribs is suppressed, and a loss in the collision load that is transmitted from the reinforcing ribs to the mounting members can be suppressed. As a result, the load transmitting performance from the impact absorbing members for a vehicle to the front side members at the time of a collision can be improved.

In a vehicle structure relating to a third aspect, in the second aspect, the reinforcing ribs are nipped by the projecting portions and by the first joining portions, the second joining portions, or a combination thereof.

In the vehicle structure relating to the third aspect, due to the reinforcing ribs being nipped by the projecting portions and at least ones of the first joining portions and the second joining portions, if collision load is inputted to the impact absorbing members for a vehicle from the vehicle front, the end portions of the reinforcing ribs deforming while sliding along the vertical wall portions of the mounting members is suppressed, and loss of the collision load that is transmitted from the reinforcing ribs to the mounting members can be suppressed. As a result, the load transmitting performance from the impact absorbing members for a vehicle to the front side members at the time of a collision can be improved. Further, before the mounting members are fastened to the impact absorbing members for a vehicle and the side members by the first fastening members and the second fastening members, the reinforcing ribs are nipped by the projecting portions and at least ones of the first joining portions and the second joining portions. The mounting members can thereby be temporarily held at the impact absorbing members for a vehicle. Because the projecting portions are molded integrally with the vertical wall portions, there is no need to add a separate step that forms a structure for temporary holding, and the number of manufacturing steps can be reduced.

A method of manufacturing a vehicle relating to a fourth aspect includes: forming, by extrusion molding, impact absorbing members for a vehicle that have closed cross-sectional structures and have reinforcing ribs that partition the closed cross-sections into a plurality of hollow portions in a height direction; forming, at pairs of side walls that face one another of the impact absorbing members for a vehicle, pairs of first through-holes that communicate with hollow portions that are at height direction upper sides of the impact absorbing members for a vehicle, and pairs of second through-holes that communicate with hollow portions that are at height direction lower sides of the impact absorbing members for a vehicle; causing mounting members, which have first tubular portions, second tubular portions provided substantially parallel to the first tubular portions, and connecting portions that have plate-shaped vertical wall portions and connect the first tubular portions and the second tubular portions, to be positioned and to be temporarily held at end portions of the impact absorbing members for a vehicle such that the first tubular portions span between the pairs of first through-holes, the second tubular portions span between the pairs of second through-holes, and the vertical wall portions are disposed so as to face or abut end portions of the reinforcing ribs and so as to project out further toward an outer side than end surfaces of the impact absorbing members for a vehicle; inserting the end portions of the impact absorbing members for a vehicle, at which the mounting members are temporarily held, into interiors of side members that are formed in shapes of hollow tubes; and mounting the impact absorbing members for a vehicle to the side members by inserting first fastening members through pairs of first insert-through holes provided in the side members, the pairs of first through-holes and interiors of the first tubular portions, and fastening the first fastening members, and inserting second fastening members through pairs of second insert-through holes provided in the side members, the pairs of second through-holes and interiors of the second tubular portions, and fastening the second fastening members.

In the method of manufacturing a vehicle relating to the fourth aspect, first, the impact absorbing members for a vehicle are formed by extrusion molding. The impact absorbing members for a vehicle are closed cross-sectional structures, and the closed cross-sections are partitioned into plural hollow portions in the vehicle vertical direction. Next, the pairs of first through-holes and the pairs of second through-holes are formed in facing pairs of side walls of the impact absorbing members for a vehicle that have been extrusion molded. Here, the pairs of first through-holes communicate with the hollow portions that are at the upper sides of the impact absorbing members for a vehicle, and the pairs of second through-holes communicate with the hollow portions that are at the lower sides.

Next, the mounting members are temporarily held at the end portions of the impact absorbing members for a vehicle. The mounting member has the first tubular portion, the second tubular portion, and the connecting portion that connects the first tubular portion and the second tubular portion and has the plate-shaped vertical wall portion. In this step, the mounting members are positioned such that the first tubular portions are made to span between the pairs of first through-holes of the impact absorbing members for a vehicle, and the second tubular portions are made to span between the pairs of second through-holes. Further, the mounting members are positioned, and are temporarily held at the end portions of the impact absorbing members for a vehicle, such that the vertical wall portions of the connecting portions are disposed to face or abut the end portions of the reinforcing ribs and project-out further toward the outer side than the end surfaces of the impact absorbing members for a vehicle.

Next, the end portions of the impact absorbing members for a vehicle, at which the mounting members are temporarily held, are inserted into the interiors of the side members that are shaped as hollow tubes. The first fastening members are inserted-through the pairs of first insert-through holes provided in the side members, the pairs of first through-holes of the impact absorbing members for a vehicle, and the interiors of the first tubular portions, and are fastened. The second fastening members are inserted-through the pairs of second insert-through holes provided in the side members, the pairs of second through-holes of the impact absorbing members for a vehicle, and the interiors of the second tubular portions, and are fastened. The impact absorbing members for a vehicle are thereby mounted to the side members.

In the above-described method of manufacturing a vehicle, the impact absorbing members for a vehicle are mounted to the side members in state in which the vertical wall portions of the connecting portions of the mounting members face or abut the end portions of the reinforcing ribs. Therefore, for example, if, in a case in which the impact absorbing members for a vehicle are mounted to the side members at the vehicle front portion, collision load is inputted from the front to the vehicle V that has been manufactured by this manufacturing method, the rear end portions of the reinforcing ribs of the impact absorbing members for a vehicle are supported by the connecting portions of the mounting members. The first tubular portions and the second tubular portions of the mounting members are connected by the connecting portions and are not independent. Thus, rotation of the tubular members, which arises in a case in which the rear end portions of the reinforcing ribs are supported at tubular members that are set independently of one another at two places above and below as described in JP-A No. 2012-116254, is suppressed or prevented. Therefore, loss of the collision load that is transmitted from the impact absorbing members for a vehicle to the mounting members is suppressed, and a decrease in the collision load that is transmitted from the impact absorbing members for a vehicle via the mounting members to the side members is suppressed. As a result, the load transmitting performance (and accordingly, the load dispersing effect) from the impact absorbing members for a vehicle to the side members improves.

Further, because the vertical wall portions of the connecting portions of the mounting members that support the reinforcing ribs are disposed so as to project-out further toward the insertion direction side than the end surfaces at the insertion direction sides of the impact absorbing members for a vehicle, there is no need to add a step of a post-processing that cuts, by cutting machining, the end portions of the reinforcing ribs. Due thereto, the load transmitting performance from the impact absorbing members for a vehicle to the side members at the time of a collision can be improved, without subjecting the reinforcing ribs to post-processing.

Moreover, because the mounting members are temporarily held in states of being positioned at the end portions of the impact absorbing members for a vehicle, the positions of the mounting members becoming offset or falling down, at the time when the impact absorbing members for a vehicle are inserted into the interiors of the side members, can be prevented.

In a method of manufacturing a vehicle relating to a fifth aspect, in the fourth aspect, the step of temporarily holding includes causing the reinforcing ribs to be nipped by projecting portions that are formed integrally with reinforcing rib side surfaces of the vertical wall portions and that extend in a vehicle transverse direction, and at least ones of first joining portions and second joining portions that join the vertical wall portions and the first tubular portions and the second tubular portions respectively.

In the method of manufacturing a vehicle relating to the fifth aspect, the mounting members are temporarily held at the end portions of the impact absorbing members for a vehicle due to the reinforcing ribs of the impact absorbing members for a vehicle being nipped by the projecting portions, which are formed integrally with the reinforcing rib side surfaces of the vertical wall portions of the mounting members, and at least ones of the first joining portions and the second joining portions. Because the projecting portions that are used in the temporary holding are formed integrally with the vertical wall portions of the mounting members, there is no need to add a separate step of forming a structure for temporary holding. Due thereto, the number of manufacturing processes can be reduced, and the manufacturing costs can be decreased.

As described above, in the vehicle structure and the method of manufacturing a vehicle relating to the present disclosure, the load transmitting performance from impact absorbing members for a vehicle to side members at the time of a collision can be improved, without subjecting reinforcing ribs of the impact absorbing members for a vehicle to post-processing.

BRIEF DESCRIPTION OF THE DRAWINGS

Exemplary embodiments of the present disclosure will be described in detail based on the following figures, wherein.

DETAILED DESCRIPTION

An embodiment of a vehicle front portion structure and a method of manufacturing vehicle V relating to the present disclosure are described hereinafter by using FIG. 1 through FIG. 7. Note that arrow FR, arrow UP and arrow OUT that are shown appropriately in these drawings indicate the vehicle front side, the vehicle upper side and the vehicle transverse direction outer side, respectively. Further, when longitudinal, left-right and vertical directions are used in the following description without being specified, they refer to the longitudinal of the vehicle longitudinal direction, the left and right of the vehicle transverse direction, and the vertical of the vehicle vertical direction, (Structure of Vehicle Front Portion Structure)

Figure 1:
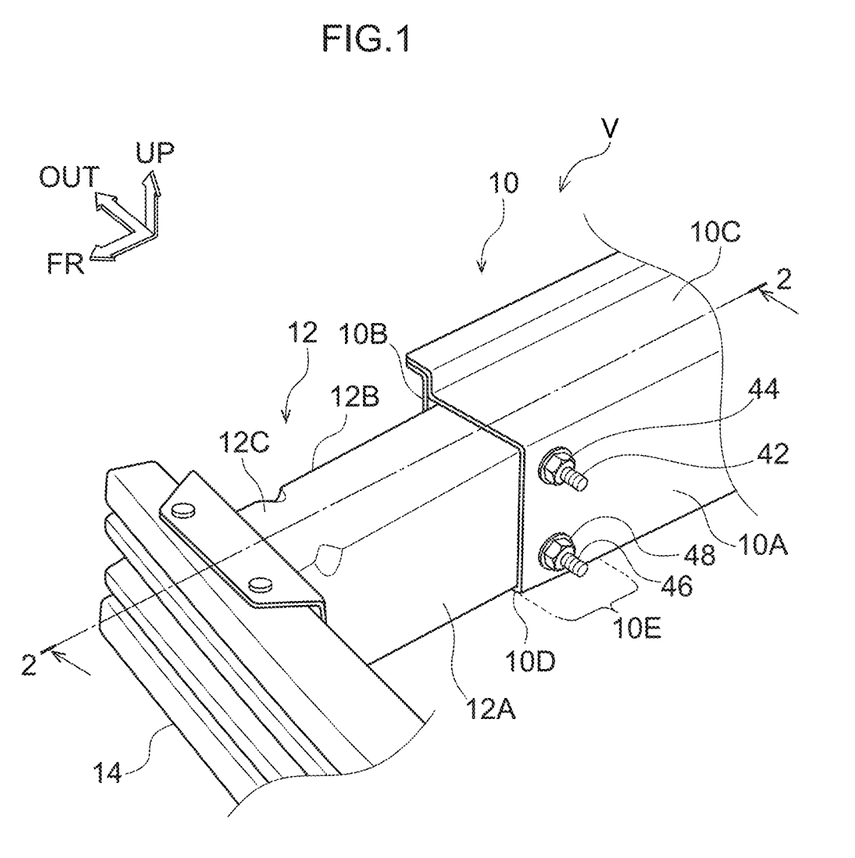
FIG. 1 is a perspective view showing the schematic structure of a vehicle front portion structure of a present embodiment.

A portion of the vehicle transverse direction right side of a vehicle front portion structure that serves as a "vehicle structure" relating to the present embodiment is shown in a perspective view in FIG. 1. As shown in this drawing, the vehicle front portion structure of the present embodiment has front side members 10 that serve as a pair of left and right "side members" and are disposed at the vehicle transverse direction both sides of the front portion of the vehicle V, and crash boxes 12 that serve as "impact absorbing members for a vehicle" and are mounted to the front ends of the front side members 10. Note that, because the structure of the vehicle transverse direction left side of the vehicle front portion structure has left-right symmetry with respect to that at the right side, description thereof is omitted, and only the structure at the vehicle transverse direction right side of the vehicle front portion structure is described hereinafter.

A bumper reinforcement 14 that extends in the vehicle transverse direction is connected to the front ends of the pair of crash boxes 12. Namely, the front side members 10 are joined to the bumper reinforcement 14 via the crash boxes 12. The bumper reinforcement 14 is a vehicle frame member that is formed from a metal material or from a fiber reinforced resin such as CFRP or the like.

(Front Side Member)

Figure 2:
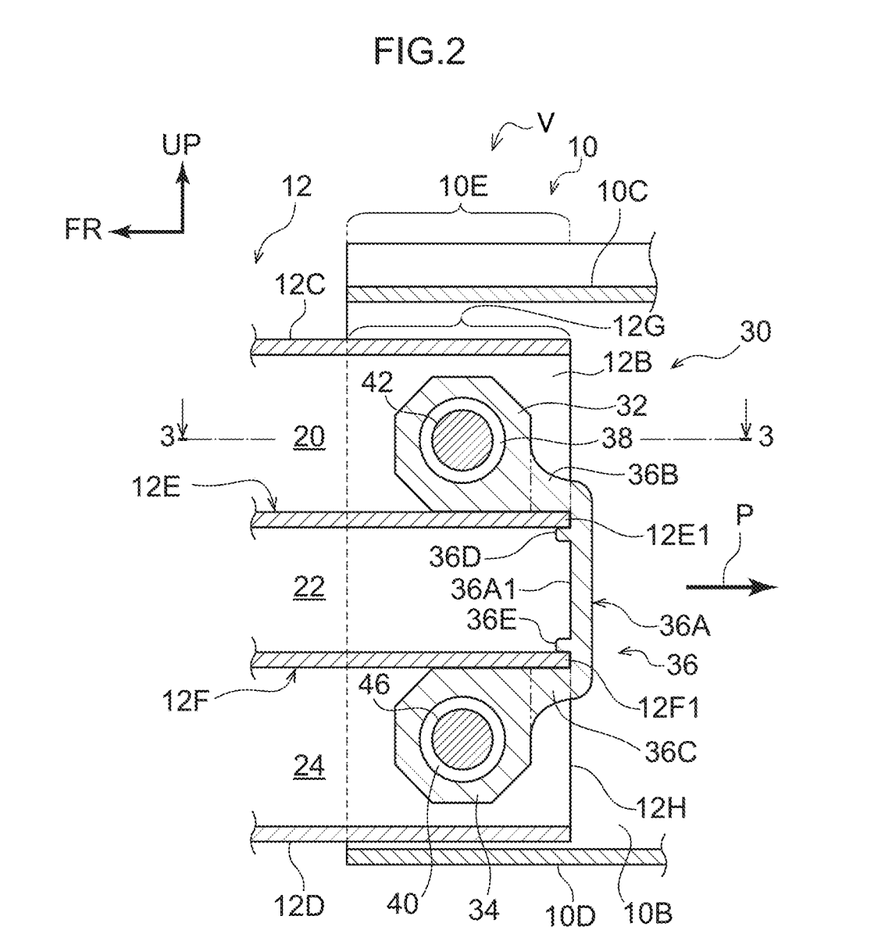
FIG. 2 is a cross-sectional view along line 2-2 of the vehicle front portion structure of the present embodiment that is shown in FIG. 1.
Figure 3:
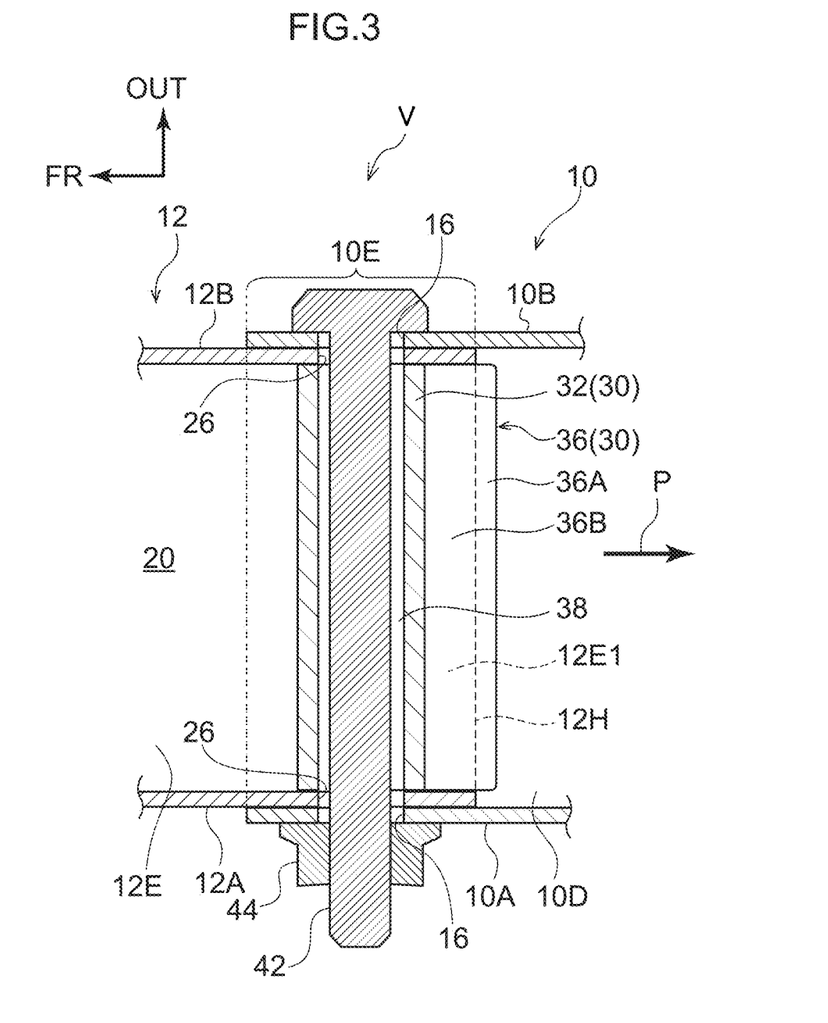
FIG. 3 is a cross-sectional view along line 3-3 of the vehicle front portion structure that is shown in FIG. 2.

A vertical sectional view of main portions of the vehicle front portion structure of the present embodiment is shown in FIG. 2. A lateral sectional view of main portions of the vehicle front portion structure is shown in FIG. 3. As shown in these drawings, the front side member 10 is a vehicle frame member that is formed in the shape of a hollow tube. The front side member 10 is structured to include an inner side wall 10A and an outer side wall 10B, which are disposed at the vehicle transverse direction inner side and the vehicle transverse direction outer side so as to be apart from one another, and an upper wall 10C and a lower wall 10D, which connect the upper end portions and the lower end portions of the inner side wall 10A and the outer side wall 10B together in the vehicle transverse direction respectively. In the inner side wall 10A and the outer side wall 10B at a front end portion 10E that serves as the "distal end portion" of the front side member 10, a pair of first insert-through holes 16 are provided so as to face one another (see FIG. 3), and an unillustrated pair of second insert-through holes are provided so as to face one another at the vehicle lower sides of the pair of first insert-through holes 16.

(Crash Box)

Figure 4:
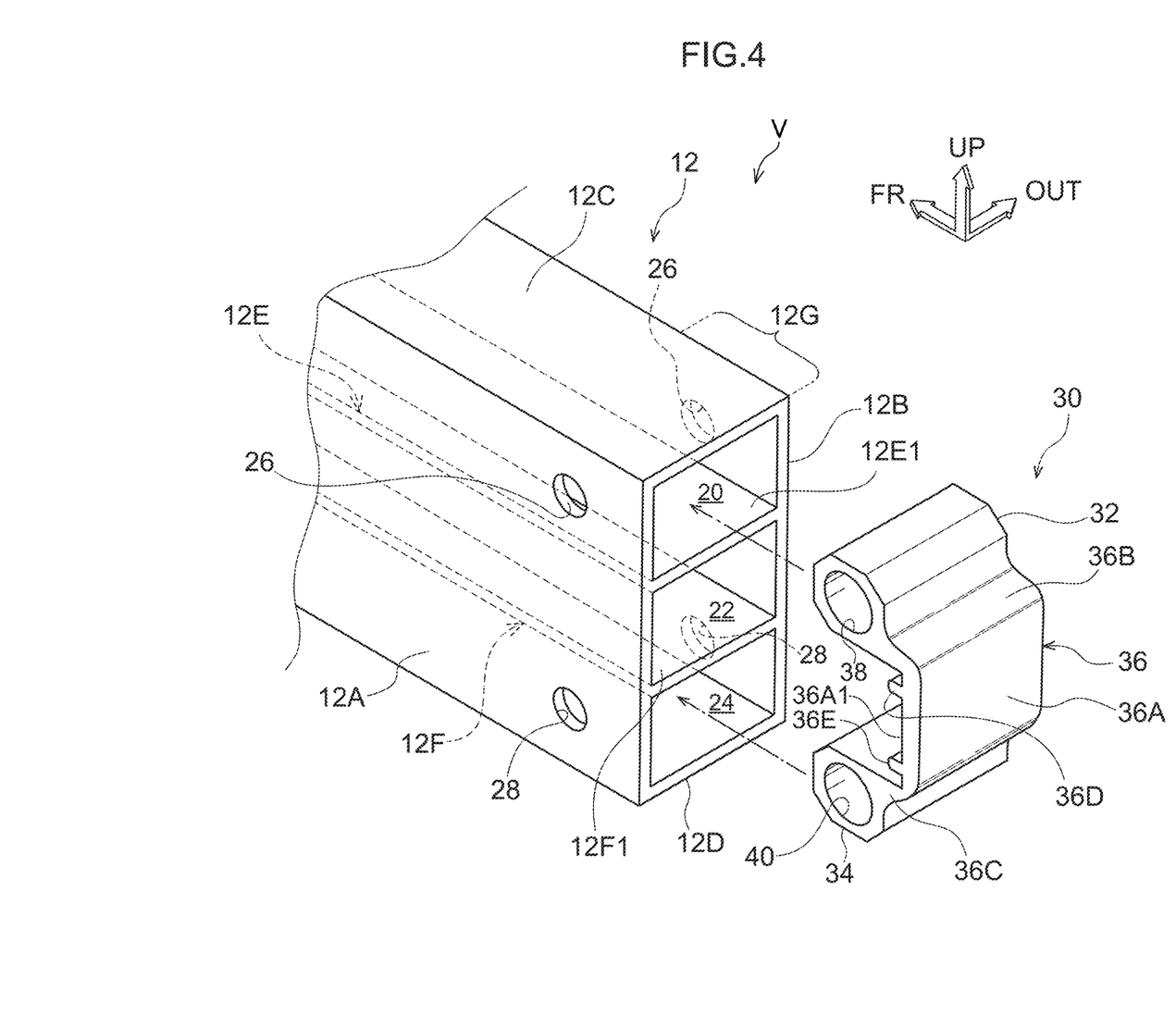
FIG. 4 is a perspective view showing a crash box and a mounting member of the present embodiment that are shown in FIG. 2 and FIG. 3.

As shown in FIG. 4, the crash box 12 of the present embodiment is a closed cross-sectional structure that extends uniformly along its entire length along the vehicle longitudinal direction. The crash box 12 is formed integrally by extrusion molding of aluminum or the like. Concretely, the crash box 12 is structured to include a first side wall 12A and a second side wall 12B, which serve as a pair of "side walls" and are disposed at the vehicle transverse direction inner side and the vehicle transverse direction outer side so as to be apart from one another, a first lateral wall 12C and a second lateral wall 12D, which connect the upper end portions and the lower end portions of the first side wall 12A and the second side wall 12B together in the vehicle transverse direction respectively, and a first reinforcing rib 12E and a second reinforcing rib 12F, which serve as "reinforcing ribs" and connect the first side wall 12A and the second side wall 12B in the vehicle transverse direction. Further, the closed cross-section of the crash box 12 is partitioned by the first reinforcing rib 12E and the second reinforcing rib 12F, which extend in the horizontal direction, into an upper hollow portion 20, a central hollow portion 22 and a lower hollow portion 24, which serve as three "hollow portions", in the vehicle vertical direction (the height direction of the crash box 12).

A pair of first through-holes 26 and a pair of second through-holes 28 are provided in the first side wall 12A and the second side wall 12B at a rear end portion 12G of the crash box 12. The pair of first through-holes 26 communicate with the upper hollow portion 20, and the pair of second through-holes 28 communicate with the lower hollow portion 24.

Further, as shown in FIG. 2, the rear end portion 12G of the crash box 12 is inserted into the interior of the front end portion 10E of the front side member 10. As shown in FIG. 3, the pair of first through-holes 26 of the crash box 12 are disposed concentrically with the pair of first insert-through holes 16 of the front side member 10. Similarly, the pair of second through-holes 28 (see FIG. 4) are disposed concentrically with the unillustrated pair of second insert-through holes of the front side member 10.

(Mounting Member)

As shown in FIG. 2 and FIG. 4, a mounting member 30 of the present embodiment is structured to include a first tubular portion 32, a second tubular portion 34 and a connecting portion 36. The mounting member 30 is formed integrally by extrusion molding of aluminum or the like for example.

At the first tubular portion 32 of the mounting member 30, the main body portion thereof which is other than the region that is joined to the connecting portion 36 is formed in the shape of a tube that substantially octagonal in cross-section, and the first tubular portion 32 has a first hollow portion 38 at the interior thereof. The first tubular portion 32 is disposed in the upper hollow portion 20 of the crash box 12 with the vehicle transverse direction being the length direction. The first hollow portion 38 is disposed concentrically with the pair of first through-holes 26 of the crash box 12 and the pair of first insert-through holes 16 of the front side member 10 (see FIG. 3).

At the second tubular portion 34 of the mounting member 30, in the same way as the first tubular portion 32, the main body portion which is other than the region that is joined to the connecting portion 36 is formed in the shape of a tube that substantially octagonal in cross-section, and the second tubular portion 34 has a second hollow portion 40 at the interior thereof. The second tubular portion 34 is disposed in the lower hollow portion 24 of the crash box 12, substantially parallel to the first tubular portion 32 and with the vehicle transverse direction being the length direction. The second hollow portion 40 is disposed concentrically with the pair of second through-holes 28 of the crash box 12 and the unillustrated pair of second insert-through holes of the front side member 10.

The first tubular portion 32 and the second tubular portion 34 are disposed further toward the deep side (the vehicle front side) of the crash box 12 than end surface 12H of the crash box 12 at the insertion direction P side (the vehicle rear side) at the time of inserting the crash box 12 into the front side member 10. Further, the first tubular portion 32 and the second tubular portion 34 extend from the first side wall 12A of the crash box 12 to the second side wall 12B. Namely, the first tubular portion 32 and the second tubular portion 34 are collar members that function as spacers that suppress or prevent buckling at the connected region of the crash box 12 and the front side member 10. Note that FIG. 3 illustrates an example in which the vehicle transverse direction both end portions of the first tubular portion 32 and the second tubular portion 34 abut the first side wall 12A and the second side wall 12B of the crash box 12, respectively. However, provided that the first tubular portion 32 and the second tubular portion 34 function as spacers, they may be made to be structures that do not abut the first side wall 12A and the second side wall 12B. For example, gaps may be provided between the first tubular portion 32 and the second tubular portion 34, and the first side wall 12A and the second side wall 12B of the crash box 12, in consideration of dimensional errors and the like.

The connecting portion 36 of the mounting member 30 connects the first tubular portion 32 and the second tubular portion 34 in the vehicle vertical direction. The connecting portion 36 has a vertical wall portion 36A, a first joining portion 36B, a second joining portion 36C, and a first projecting portion 36D and a second projecting portion 36E that serve as "projecting portions".

The vertical wall portion 36A of the connecting portion 36 is a member that is substantially flat-plate-shaped and is disposed so as to project-out further toward the insertion direction P side than the end surface 12H of the crash box 12, at the insertion direction P side (the vehicle rear side) at the time when the crash box 12 is inserted in the front side member 10. Front surface 36A1, which serves as the "reinforcing rib side surface" of the vertical wall portion 36A abuts rear end portion 12E1 of the first reinforcing rib 12E and rear end portion 12F1 of the second reinforcing rib 12F. Note that the front surface 36A1 of the vertical wall portion 36A does not necessarily have to abut the rear end portion 12E1 of the first reinforcing rib 12E and the rear end portion 12F1 of the second reinforcing rib 12F. For example, in consideration of dimensional errors and the like, the front surface 36A1 of the vertical wall portion 36A may be made to face the rear end portion 12E1 of the first reinforcing rib 12E and the rear end portion 12F1 of the second reinforcing rib 12F, with a gap provided therebetween.

The first joining portion 36B and the second joining portion 36C of the connecting portion 36 respectively project-out from the vehicle vertical direction end portions of the vertical wall portion 36A toward the vehicle front side while heading toward the interior of the closed cross-section of the crash box 12. The first joining portion 36B joins the vertical wall portion 36A and the first tubular portion 32, and the second joining portion 36C joins the vertical wall portion 36A and the second tubular portion 34. Further, the first joining portion 36B and the second joining portion 36C are structured such that, as seen from the vehicle transverse direction, the vehicle vertical direction dimensions thereof become larger toward the vehicle front side.

The first projecting portion 36D and the second projecting portion 36E project-out toward the vehicle front side from the front surface 36A1 of the vertical wall portion 36A. The first projecting portion 36D and the second projecting portion 36E extend in the vehicle transverse direction. The first projecting portion 36D is disposed such that the first reinforcing rib 12E is nipped from above and below by the first joining portion 36B and the first projecting portion 36D. Similarly, the second projecting portion 36E is disposed such that the second reinforcing rib 12F is nipped from above and below by the second joining portion 36C and the second projecting portion 36E. Note that the present embodiment illustrates an example in which the first projecting portion 36D and the second projecting portion 36E that serve as two "projecting portions" are provided at the connecting portion 36 of the mounting member 30, but there may be a structure in which only one of the projecting portions is provided. In this case, the projecting portion may be disposed such that the first reinforcing rib 12E is nipped by the projecting portion and the first joining portion 36B, or the projecting portion may be disposed such that the second reinforcing rib 12F is nipped by the projecting portion and the second joining portion 36C.

As shown in FIG. 3, the first tubular portion 32 is fastened to the front side member 10 and the crash box 12 by a first bolt 42 and a first nut 44 that serve as "first fastening members". In further detail, the first bolt 42, which is inserted from the first insert-through hole 16 that is provided in the outer side wall 10B of the front side member 10, is inserted-through the pair of first through-holes 26 and the first hollow portion 38 that is at the interior of the first tubular portion 32 of the mounting member 30, and is further passed-through the first insert-through hole 16 that is provided at the inner side wall 10A, and is screwed-together with the first nut 44 at the vehicle transverse direction inner side of the inner side wall 10A. Similarly, a second bolt 46, which serves as a "second fastening member" and is inserted from the unillustrated second insert-through hole that is provided in the outer side wall 10B of the front side member 10, is inserted-through the pair of second through-holes 28 and the second hollow portion 40 that is at the interior of the second tubular portion 34 of the mounting member 30, and is screwed-together with an unillustrated second nut at the vehicle transverse direction inner side of the inner side wall 10A. The crash box 12 is thereby mounted to the front side member 10.

(Method of Manufacturing Vehicle)

The method of manufacturing the vehicle V of the present embodiment is described next.

First, as shown in FIG. 4, the crash box 12 that structures a portion of the vehicle V is formed by extrusion molding. The crash box 12 is formed by the extrusion molding of aluminum or the like for example. The closed cross-section, which is cut along a plane that is substantially orthogonal to the extruding direction, of the crash box 12 is partitioned by the first reinforcing rib 12E and the second reinforcing rib 12F in the height direction into plural hollow portions (the upper hollow portion 20, the central hollow portion 22 and the lower hollow portion 24).

Next, the pair of first through-holes 26 that communicate with the upper hollow portion 20 of the crash box 12, and the pair of second through-holes 28 that communicate with the lower hollow portion 24, are formed in the first side wall 12A and the second side wall 12B, which face one another, of the crash box 12 that is obtained by extrusion molding.

Next, the mounting member 30 is temporarily held at the rear end portion 12G of the crash box 12. At this time, the mounting member 30 is positioned as follows. The first tubular portion 32 is made to span between the pair of first through-holes 26, and the second tubular portion 34 is made to span between the pair of second through-holes 28. Further, as shown in FIG. 2, the vertical wall portion 36A abuts the rear end portion 12E1 of the first reinforcing rib 12E and the rear end portion 12F1 of the second reinforcing rib 12F, and the vertical wall portion 36A is disposed so as to project-out further toward the outer side than the end surface 12H of the crash box 12.

In the above-described step of temporarily holding the mounting member 30 at the crash box 12, the first reinforcing rib 12E of the crash box 12 is nipped by the first joining portion 36B and the first projecting portion 36D, and the second reinforcing rib 12F is nipped by the second joining portion 36C and the second projecting portion 36E. The height direction positions of the first projecting portion 36D and the second projecting portion 36E at the vertical wall portion 36A are set such that the above-described positioning and temporary holding are accomplished by the above.

Next, the rear end portion 12G of the crash box 12 at which the mounting member 30 is temporarily held is inserted into the interior of the front side member 10 that is a frame member of the vehicle V.

Next, the crash box 12 is mounted to the front side member 10. Concretely, first, the first bolt 42 is inserted-in from the first insert-through hole 16 that is provided in the outer side wall 10B of the front side member 10. This first bolt 42 is inserted-through the pair of first through-holes 26 of the crash box 12 and the first hollow portion 38 that is at the interior of the first tubular portion 32 of the mounting member 30, and is screwed-together with the first nut 44 at the vehicle transverse direction inner side of the inner side wall 10A. Similarly, the second bolt 46 is inserted-in from the unillustrated second insert-through hole that is provided in the outer side wall 10B of the front side member 10, and the second bolt 46 is inserted-through the pair of second through-holes 28 of the crash box 12 and the second hollow portion 40 that is at the interior of the second tubular portion 34 of the mounting member 30, and is screwed-together with a second nut 48 (see FIG. 1) at the vehicle transverse direction inner side of the inner side wall 10A. Note that the first bolt 42 and the second bolt 46 may be inserted-in from the first insert-through holes 16 that are provided at the inner side wall 10A of the front side member 10, and screwed-together with the first nut 44 and the second nut 48 at the vehicle transverse direction outer side of the outer side wall 10B, respectively.

(Operation and Effects)

Figure 6A:
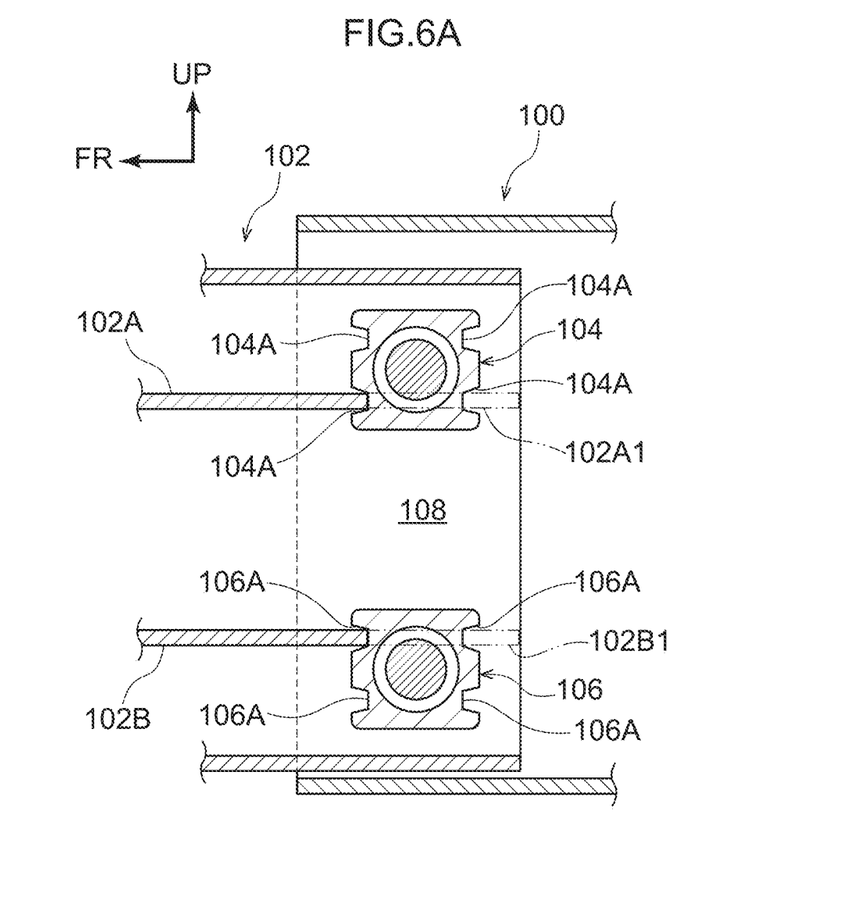
FIG. 6A is a vertical sectional view showing main portions of a vehicle front portion structure relating to a comparative example.
Figure 6B:
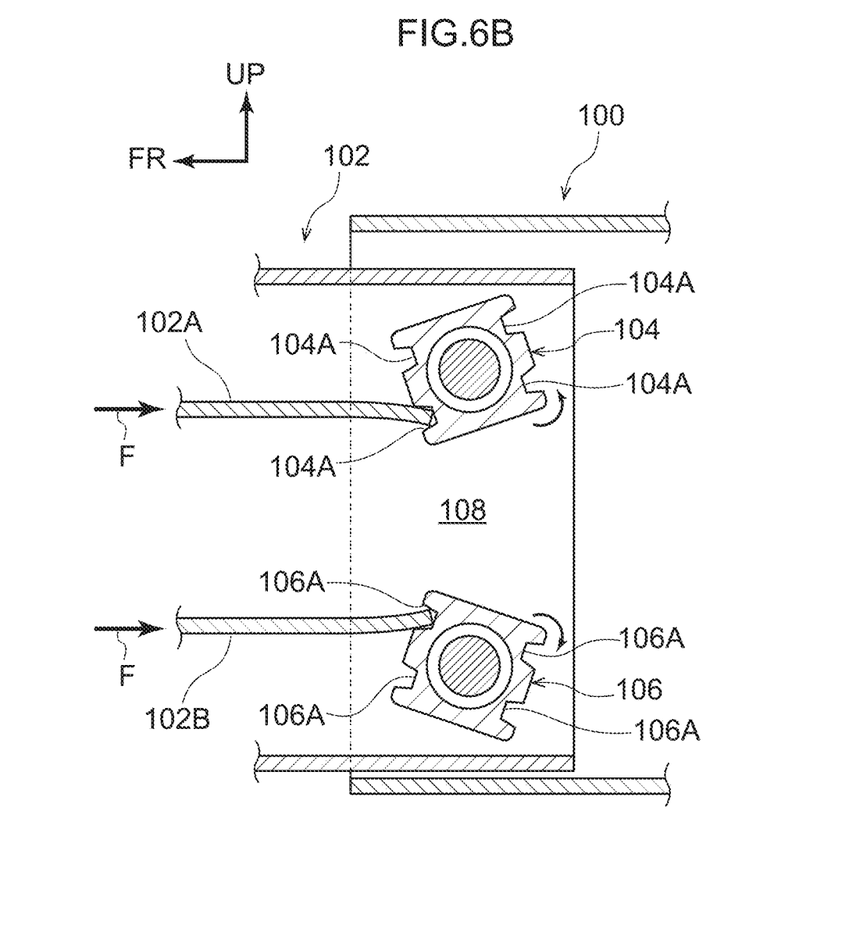
FIG. 6B is a drawing showing a state in which collision load is inputted to the vehicle front portion structure shown in FIG. 6A.
Figure 7:
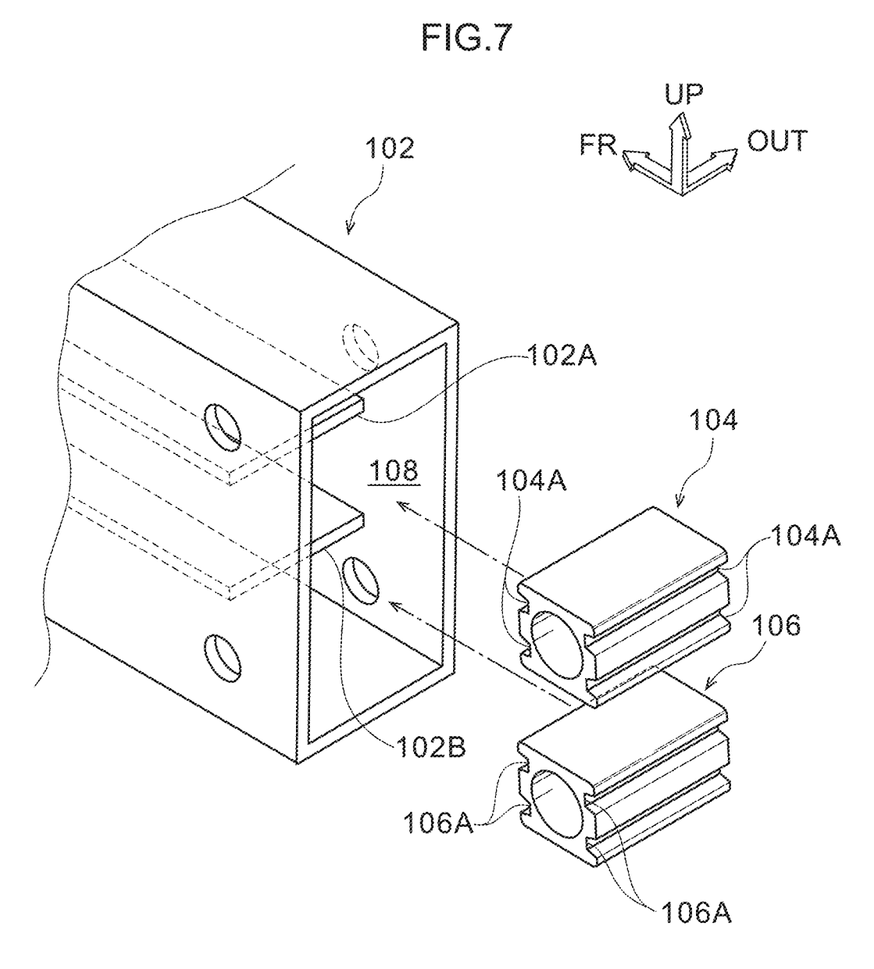
FIG. 7 is a perspective view showing a crash box and mounting members relating to the comparative example shown in FIG. 6A and FIG. 6B.

Operation and effects of the present embodiment are described next in comparison with a comparative example that is illustrated in FIG. 6A through FIG. 7.

A vehicle front portion structure, which relates to a comparative example and is shown in FIG. 6A through FIG. 7, is structured to include front side members 100, crash boxes 102, first mounting members 104 and second mounting members 106. The first mounting member 104 and the second mounting member 106 are respectively formed in tubular shapes, and are independent without being connecting to one another. In other words, the first mounting member 104 and the second mounting member 106 respectively are disposed separately in a hollow portion 108 of the crash box 102 (see FIG. 7). The first mounting portion 104 has plural concave portions 104A. A first reinforcing rib 102A of the crash box 102 abuts the vehicle lower side one concave portion 104A among the concave portions 104A that open toward the vehicle front side. The second mounting member 106 has plural concave portions 106A. A second reinforcing rib 102B of the crash box 102 abuts the vehicle upper side one concave portion 106A among the concave portions 106A that open toward the vehicle front side.

In the vehicle front portion structure relating to the comparative example, the first reinforcing rib 102A and the second reinforcing rib 102B are respectively made to abut the first mounting member 104 and the second mounting member 106 that are disposed in the hollow portion 108 of the crash box 102. Therefore, the step of a post-processing that cuts, by cutting machining, a rear end portion 102A1 of the first reinforcing rib 102A and a rear end portion 102B1 of the second reinforcing rib 102B of the crash box 102 that is obtained by extrusion molding (see FIG. 6A), is needed.

Further, in the vehicle front portion structure relating to the comparative example, the first mounting member 104 and the second mounting member 106 are not connected to one another and are independent. The position, at which the first mounting member 104 supports the first reinforcing rib 102A of the crash box 102, is offset toward the vehicle lower side from the axis of the first mounting member 104. The position, at which the second mounting member 106 supports the second reinforcing rib 102B of the crash box 102, is offset toward the vehicle upper side from the axis of the second mounting member 106. Therefore, as shown in FIG. 6B, in a case in which collision load F is inputted from the vehicle front, the first mounting member 104 and the second mounting member 106 respectively rotate around the axes. Due thereto, as compared with a case in which the first mounting member 104 and the second mounting member 106 do not rotate, a loss in the transmission of the collision load from the crash box 102 to the first mounting member 104 and the second mounting member 106 arises, and not only is incomplete crushing of the crash box 102 brought about, but also, the collision load that is transmitted from the crash box 102 via the first mounting member 104 and the second mounting member 106 to the front side member 100 also decreases, and the load transmitting performance (and accordingly, the load dispersing effect) deteriorates.

In contrast, in the vehicle front portion structure relating to the present embodiment, as shown in FIG. 2, the mounting member 30 is structured to include the first tubular portion 32, the second tubular portion 34, and the connecting portion 36 that connects the first tubular portion 32 and the second tubular portion 34 in the vehicle vertical direction. The first tubular portion 32 is disposed in the upper hollow portion 20 of the crash box 12 with the vehicle transverse direction being the length direction of the first tubular portion 32. The first tubular portion 32 is fastened to the front side member 10 and the crash box 12 by the first bolt 42 that is inserted-through the interior of the first tubular portion 32. The second tubular portion 34 is provided substantially parallel to the first tubular portion 32, and is disposed in the lower hollow portion 24 of the crash box 12 with the vehicle transverse direction being the length direction of the second tubular portion 34. The second tubular portion 34 is fastened to the front side member 10 and the crash box 12 due to the second bolt 46 being inserted-through the interior of the second tubular portion 34.

Further, the rear end portion 12E1 of the first reinforcing rib 12E of the crash box 12 and the rear end portion 12F1 of the second reinforcing rib 12F face or abut the vertical wall portion 36A of the connecting portion 36 of the mounting member 30 that projects-out further toward the insertion direction P side than the end surface 12H of the crash box 12. Therefore, in a case in which collision load is inputted to the crash box 12 from the vehicle front, the rear end portion 12E1 of the first reinforcing rib 12E and the rear end portion 12F1 of the second reinforcing rib 12F are supported by the connecting portion 36 of the mounting member 30. Because the first tubular portion 32 and the second tubular portion 34 of the mounting member 30 are connected by the connecting portion 36 and are not independent, rotation (see FIG. 6B) of the first mounting member 104 and the second mounting member 106 that arises in the above-described comparative example is suppressed or prevented. Thus, loss of the collision load that is transmitted from the crash box 12 to the mounting member 30 is suppressed, and a decrease in the collision load that is transmitted from the crash box 12 via the mounting member 30 to the front side member 10 is suppressed. As a result, the load transmitting performance from the crash box 12 to the front side member 10 (and accordingly, the load dispersing effect) improves. Further, the vertical wall portion 36A of the connecting portion 36 of the mounting member 30, which supports the first reinforcing rib 12E and the second reinforcing rib 12F, projects-out further toward the insertion direction P side than the end surface 12H in the insertion direction P of the crash box 12. Therefore, a step of a post-processing that cuts, by cutting machining, the rear end portion 12E1 of the first reinforcing rib 12E and the rear end portion 12F1 of the second reinforcing rib 12F, is not needed. As compared with the vehicle front portion structure relating to the above-described comparative example (see FIG. 6A), the number of manufacturing steps can be reduced, and the manufacturing cost can be reduced.

Further, in the vehicle front portion structure relating to the present embodiment, the first tubular portion 32 and the second tubular portion 34 of the mounting member 30 are disposed further toward the deep side, i.e., the vehicle front side, of the crash box 12 than the end surface 12H of the crash box 12. Accordingly, the first joining portion 36B, which joins the vertical wall portion 36A of the connecting portion 36 and the first tubular portion 32 at the mounting member 30, and the second joining portion 36C, which joins the vertical wall portion 36A and the second tubular portion 34, project-out from the vehicle vertical direction end portions of the vertical wall portion 36A toward the interior of the closed cross-section. Further, the first projecting portion 36D and the second projecting portion 36E of the connecting portion 36 are formed integrally with the vertical wall portion 36A at the front surface 36A1 of the vertical wall portion 36A, and extend in the vehicle transverse direction. Due to the first projecting portion 36D and the second projecting portion 36E being provided at the front surface 36A1 of the vertical wall portion 36A, even if collision load is inputted from the vehicle front to the impact absorbing member for a vehicle, the rear end portion 12E1 of the first reinforcing rib 12E and the rear end portion 12F1 of the second reinforcing rib 12F deform while sliding in the vehicle vertical direction along the front surface 36A1 of the vertical wall portion 36A, and anchor on the first projecting portion 36D and the second projecting portion 36E. Due thereto, as compared with a structure in which the first projecting portion 36D and the second projecting portion 36E are not provided, large deformation of the first reinforcing rib 12E and the second reinforcing rib 12F is suppressed, and a loss in the collision load that is transmitted to the mounting member 30 can be suppressed. As a result, the load transmitting performance from the crash box 12 to the front side member 10 at the time of a collision can be improved.

In the vehicle front portion structure relating to the present embodiment, the first reinforcing rib 12E is nipped by the first projecting portion 36D and the first joining portion 36B, and the second reinforcing rib 12F is nipped by the second projecting portion 36E and the second joining portion 36C. Therefore, even if collision load is inputted from the vehicle front to the crash box 12, the rear end portion 12E1 of the first reinforcing rib 12E and the rear end portion 12F1 of the second reinforcing rib 12F deforming while sliding along the vertical wall portion 36A of the mounting member 30 is suppressed, and a loss in the collision load that is transmitted from the first reinforcing rib 12E and the second reinforcing rib 12F to the mounting member 30 can be suppressed. As a result, the load transmitting performance from the crash box 12 to the front side member 10 at the time of a collision can be improved. Further, the mounting member 30 can be temporarily held at the first reinforcing rib 12E and the second reinforcing rib 12F of the crash box 12. Because the first projecting portion 36D and the second projecting portion 36E are formed integrally with the vertical wall portion 36A, there is no need to add a separate step of forming a structure for temporary holding, and the number of manufacturing processes can be reduced, and the manufacturing cost can be reduced.

In the method of manufacturing the vehicle V relating to the present embodiment, first, as shown in FIG. 4, the crash box 12 is formed by extrusion molding. The crash box 12 is made to be a closed cross-sectional structure, and the closed cross-section is partitioned by the first reinforcing rib 12E and the second reinforcing rib 12F into plural hollow portions (the upper hollow portion 20, the central hollow portion 22 and the lower hollow portion 24) in the height direction. Next, the pair of first through-holes 26 and the pair of second through-holes 28 are formed in the first side wall 12A and the second side wall 12B, which are a pair that face one another, of the crash box 12 that is formed by extrusion molding. Here, the pair of first through-holes 26 communicate with the upper hollow portion 20 of the crash box 12, and the pair of second through-holes 28 communicate with the lower hollow portion 24.

Next, the mounting member 30 is temporarily held at the rear end portion 12G of the crash box 12. The mounting member 30 has the first tubular portion 32, the second tubular portion 34, and the connecting portion 36 that has the plate-shaped vertical wall portion 36A and connects the first tubular portion 32 and the second tubular portion 34. In this step, the mounting member 30 is positioned such that the first tubular portion 32 is made to span between the pair of first through-holes 26 of the crash box 12, and the second tubular portion 34 is made to span between the pair of second through-holes 28. Further, the mounting member 30 is positioned, and is temporarily held at the rear end portion 12G of the crash box 12, such that the vertical wall portion 36A of the connecting portion 36 faces or abuts the rear end portion 12E1 of the first reinforcing rib 12E and the rear end portion 12F1 of the second reinforcing rib 12F, and is disposed so as to project-out further toward the outer side than the end surface 12H of the crash box 12.

Next, as shown in FIG. 2, the rear end portion 12G of the crash box 12 at which the mounting member 30 is temporarily held is inserted into the interior of the front side member 10 that is shaped as a hollow tube. Further, the first bolt 42 is inserted-through the pair of first insert-through holes 16 that are provided in the front side member 10, and the pair of first through-holes 26 of the crash box 12, and the interior of the first tubular portion 32 (the first hollow portion 38), and is fastened. Moreover, the second bolt 46 is inserted-through the unillustrated pair of second insert-through holes that are provided in the front side member 10, the pair of second through-holes 28 of the crash box 12, and the interior of the second tubular portion 34 (the second hollow portion 40), and is fastened. The crash box 12 is thereby mounted to the front side member 10.

The crash box 12 is mounted to the front side member 10 in a state in which the vertical wall portion 36A of the connecting portion 36 of the mounting member 30 faces or abuts the rear end portion 12E1 of the first reinforcing rib 12E and the rear end portion 12F1 of the second reinforcing rib 12F. Therefore, even if collision load is inputted from the front to the vehicle V that has been manufactured by this manufacturing method, the rear end portion 12E1 of the first reinforcing rib 12E and the rear end portion 12F1 of the second reinforcing rib 12F are supported by the connecting portion 36 of the mounting member 30. Because the first tubular portion 32 and the second tubular portion 34 of the mounting member 30 are connected by the connecting portion 36 and are not independent, rotation of the first mounting member 104 and the second mounting member 106 that arises in the above-described comparative example (see FIG. 6B) is suppressed or prevented. Therefore, loss of the collision load that is transmitted from the crash box 12 to the mounting member 30 is suppressed, and a decrease in the collision load that is transmitted from the crash box 12 via the mounting member 30 to the front side member 10 is suppressed. As a result, the load transmitting performance (and accordingly, the load dispersing effect) from the crash box 12 to the front side member 10 improves.

Further, the vertical wall portion 36A of the connecting portion at the mounting member 30, which supports the first reinforcing rib 12E and the second reinforcing rib 12F, is disposed so as to project-out further toward the outer side (the insertion direction P side) than the end surface 12H that is at the insertion direction P side of the crash box 12. Therefore, there is no need to add a step of a post-processing that cuts, by cutting machining, the rear end portion 12E1 of the first reinforcing rib 12E and the rear end portion 12F1 of the second reinforcing rib 12F. Due thereto, the load transmitting performance from the crash box 12 to the front side member 10 at the time of a collision can be improved, without subjecting the first reinforcing rib 12E and the second reinforcing rib 12F to post-processing.

Moreover, because the mounting member 30 is temporarily held in a state in which it is positioned at the rear end portion 12G of the crash box 12, the position of the mounting member 30 becoming offset or falling down at the time when the crash box 12 is inserted into the interior of the front side member 10 can be prevented.

Further, in the method of manufacturing the vehicle V relating to the present embodiment, in the step of temporarily holding the mounting member 30, the first reinforcing rib 12E of the crash box 12 is nipped by the first joining portion 36B and the first projecting portion 36D that is formed integrally with the front surface 36A1 of the vertical wall portion 36A of the mounting member 30. Similarly, the second reinforcing rib 12F is nipped by the second joining portion 36C and the second projecting portion 36E. Because the first projecting portion 36D and the second projecting portion 36E are formed integrally with the vertical wall portion 36A, there is no need to add a separate step of forming a structure for temporary holding, and the number of manufacturing processes can be reduced, and the manufacturing costs can be decreased.

Modified Example

The above-described embodiment illustrates an example in which, as shown in FIG. 2, the first reinforcing rib 12E of the crash box 12 is nipped by the first joining portion 36B and the first projecting portion 36D of the mounting member 30, and the second reinforcing rib 12F is nipped by the second joining portion 36C and the second projecting portion 36E. However, embodiments of the present disclosure are not limited to this.

Figure 5:
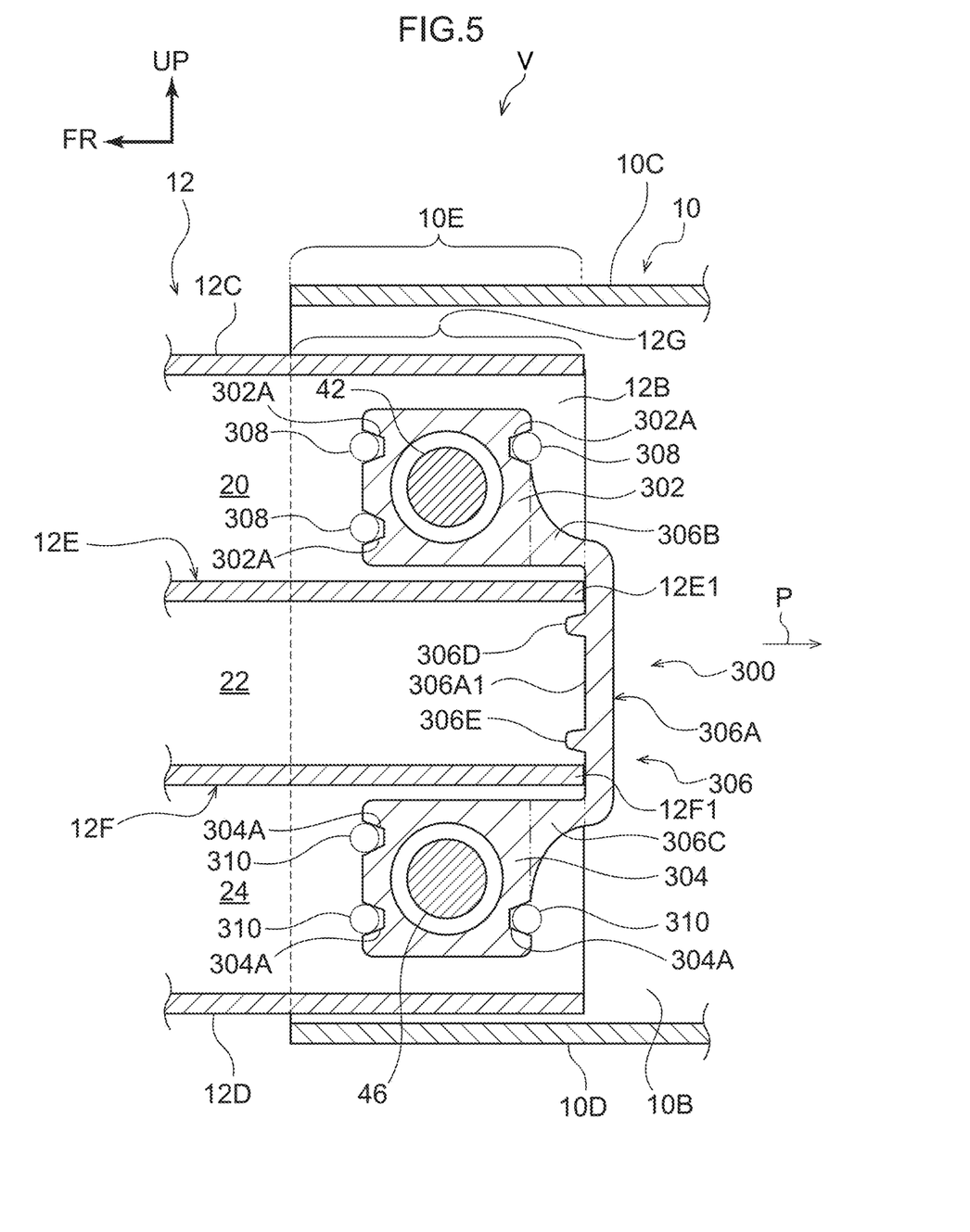
FIG. 5 is a vertical sectional view showing main portions of a vehicle front portion structure relating to a modified example of the present embodiment.

For example, as shown in FIG. 5, the first reinforcing rib 12E is disposed between a first joining portion 306B of a connecting portion 306 of a mounting member 300 and a first projecting portion 306D that serves as a "projecting portion", and does not have to be nipped therebetween. Similarly, the second reinforcing rib 12F is disposed between a second joining portion 306C and a second projecting portion 306E that serves as a "projecting portion", and does not have to be nipped therebetween.

In the present modified example, plural concave portions 302A, 304A are provided along the vehicle transverse direction in a first tubular portion 302 and a second tubular portion 304, respectively. Further, three pairs of upper-side embossed portions 308, which are formed in shapes that are convex toward the upper hollow portion 20 of the interior of the crash box 12 and that face one another, are formed at the first side wall 12A and the second side wall 12B. Similarly, three pairs of lower-side embossed portions 310, which are formed in shapes that are convex toward the lower hollow portion 24 of the interior of the crash box 12 and that face one another, are formed at the first side wall 12A and the second side wall 12B of the crash box 12. Note that the upper-side embossed portions 308 and the lower-side embossed portions 310 that are formed at the first side wall 12A are not illustrated.

In this modified example, the concave portions 302A are fit-together with the upper-side embossed portions 308 at the vehicle transverse direction both end portions of the first tubular portion 302, and the concave portions 304A are fit-together with the lower-side embossed portions 310 at the vehicle transverse direction both end portions of the second tubular portion 304. Namely, in the method of manufacturing the vehicle V to which the vehicle front portion structure of the present modified example is applied, by fitting the concave portions 302A of the first tubular portion 302 and the concave portions 304A of the second tubular portion 304 together with the upper-side embossed portions 308 and the lower-side embossed portions 310, respectively, the mounting member 300 is positioned, and is temporarily held at the rear end portion 12G of the crash box 12.

In the structure of the present modified example as well, in the same way as in the above-described embodiment, the load transmitting performance from the crash box 12 to the front side member 10 can be improved without subjecting the first reinforcing rib 12E and the second reinforcing rib 12F to post-processing.

Further, in the present modified example, the first projecting portion 306D and the second projecting portion 306E suppress the first reinforcing rib 12E and the second reinforcing rib 12F being displaced so as to slide in the vehicle vertical direction along a front surface 306A1, which serves as the "reinforcing rib side surface", of the vertical wall portion 306A and greatly deforming. Therefore, as compared with a structure in which the first projecting portion 306D and the second projecting portion 306E are not provided, large deformation of the first reinforcing rib 12E and the second reinforcing rib 12F is suppressed, and the load transmitting performance to the mounting member 300 can be improved.

Note that the above-described modified example illustrates an example in which three pairs of each of the upper-side embossed portions 308 and lower-side embossed portions 310 are provided. However, because it suffices to enable positioning and temporary holding, the numbers of the upper-side embossed portions 308 and lower-side embossed portions 310 do not have to be three pairs. For example, one pair or two pairs of each of the upper-side embossed portions 308 and lower-side embossed portions 310 may be provided. Similarly, the numbers of the concave portions 302A and concave portions 304A also are not limited to three pairs, and may be one pairs or two pairs for example.

The above-described modified example illustrates an example in which the first projecting portion 306D and the second projecting portion 306E are provided as two "projecting portions", but embodiments of the present disclosure are not limited to this. For example, there may be a structure in which only one projecting portion is provided at the front surface 306A1 of the vertical wall portion 306A. In this case as well, when the first reinforcing rib 12E and the second reinforcing rib 12F deform while sliding in the vehicle vertical direction along the vertical wall portion 306A, they anchor on the projecting portion. Therefore, as compared with a structure that does not have a projecting portion, large deformation of the first reinforcing rib 12E and the second reinforcing rib 12F can be suppressed, and the load transmitting performance to the mounting member 300 can be improved.

Other Modified Examples

Although the above-described embodiment illustrates an example in which the reinforcing ribs of the crash box 12 are the two ribs that are the first reinforcing rib 12E and the second reinforcing rib 12F, embodiments of the present disclosure are not limited to this. For example, there may be one reinforcing rib. In this case, the reinforcing rib may be nipped by the first projecting portion and the second projecting portion. Or, only one projecting portion may be provided, and the reinforcing rib may be nipped by the projecting portion and the first joining portion 36B or the second joining portion 36C. As another example, the mounting member may be temporarily held at the crash box by the embossed portions of the above-described modified example, without the reinforcing rib(s) being nipped by portions of the mounting member.

Further, although the above embodiment describes a vehicle front portion structure, embodiments of the present disclosure are not limited to this. For example, a vehicle rear portion structure also is an embodiment of the present disclosure. In this case, the "side members" are the rear side members that are disposed at the both sides of the vehicle rear portion, and the front end portions, which serve as the "end portions", of the crash boxes are inserted into the interiors of the rear end portions, which serve as the "distal end portions", of the rear side members. Accordingly, the direction of insertion of the crash box into the rear side member is the vehicle front side. The connecting portion of the mounting member projects-out further toward the vehicle front side than end surface that is at the front end side of the crash box. In this structure as well, the load transmitting performance to the rear side member in a case in which collision load is inputted from the rear of the crash box can be improved. Moreover, the present disclosure may be applied to both a vehicle front portion structure and a vehicle rear portion structure.

Further, in the above-described embodiment, the first tubular portion 32 and the second tubular portion 34 of the mounting member 30 are, except for the regions thereof that are connected to the connecting portion 36, formed in tubular shapes that are substantially octagonal in cross-section. However, embodiments of the present disclosure are not limited to this. The cross-sectional shapes of the first tubular portion 32 and the second tubular portion 34 may be other shapes such as, for example, cylindrical tube shapes, rectangular tube shapes, hexagonal tube shapes, or the like.

What is claimed is:

1. A vehicle structure comprising:
a pair of left and right side members that are respectively disposed at both vehicle transverse direction sides of a vehicle front portion and rear portion, and that are formed in shapes of hollow tubes that extend along a vehicle longitudinal direction;

a pair of left and right impact absorbing members for a vehicle that are closed cross-sectional structures that extend uniformly along entire lengths thereof along the vehicle longitudinal direction, that have reinforcing ribs that partition the closed cross-sections into a plurality of hollow portions in a vehicle vertical direction, and that have end portions inserted into interiors of distal end portions of the side members; and mounting members that have:

first tubular portions, which are disposed within hollow portions that are at vehicle upper sides of the impact absorbing members for a vehicle with length directions being a vehicle transverse direction and which are fastened to the side members and the impact absorbing members for a vehicle by first fastening members that are inserted through interiors of the first tubular portions, second tubular portions, which are provided substantially parallel to the first tubular portions and are disposed within hollow portions that are at vehicle lower sides of the impact absorbing members for a vehicle with length directions being the vehicle transverse direction and which are fastened to the side members and the impact absorbing members for a vehicle by second fastening members that are inserted through interiors of the second tubular portions, and connecting portions, which connect the first tubular portions and the second tubular portions in the vehicle vertical direction and which include vertical wall portions that are plate-shaped and project out further toward an insertion direction side than insertion direction side end surfaces of the impact absorbing members for a vehicle and face or abut end portions of the reinforcing ribs.

2. The vehicle structure of claim 1, wherein:

the first tubular portions and the second tubular portions are disposed further toward inward sides than the end surfaces of the impact absorbing members for a vehicle, and the connecting portions include:

the vertical wall portions;

first joining portions and second joining portions that project out from the vertical wall portions toward interiors of the closed cross-sections of the impact absorbing members for a vehicle, and join the vertical wall portions and the first tubular portions and the second tubular portions respectively; and projecting portions that are formed integrally with reinforcing rib side surfaces of the vertical wall portions and extend in the vehicle transverse direction.

3. The vehicle structure of claim 2, wherein the reinforcing ribs are nipped by the projecting portions and by the first joining portions, the second joining portions, or a combination thereof.

4. The vehicle structure of claim 3, wherein:

the reinforcing ribs include first reinforcing ribs and second reinforcing ribs, the projecting portions include first projecting portions and second projecting portions, the first projecting portions are disposed such that the first reinforcing ribs are nipped from above and below by the first joining portions and the first projecting portions, and the second projecting portions are disposed such that the second reinforcing ribs are nipped from above and below by the second joining portions and the second projecting portions.

5. A method of manufacturing a vehicle, comprising:

forming, by extrusion molding, impact absorbing members for a vehicle that have closed cross-sectional structures and have reinforcing ribs that partition the closed cross-sections into a plurality of hollow portions in a height direction;

forming, at pairs of side walls that face one another of the impact absorbing members for a vehicle, pairs of first through-holes that communicate with hollow portions that are at height direction upper sides of the impact absorbing members for a vehicle, and pairs of second through-holes that communicate with hollow portions that are at height direction lower sides of the impact absorbing members for a vehicle;

causing mounting members, which have first tubular portions, second tubular portions provided substantially parallel to the first tubular portions, and connecting portions that have plate-shaped vertical wall portions and connect the first tubular portions and the second tubular portions, to be positioned and to be temporarily held at end portions of the impact absorbing members for a vehicle such that the first tubular portions span between the pairs of first through-holes, the second tubular portions span between the pairs of second through-holes, and the vertical wall portions are disposed so as to face or abut end portions of the reinforcing ribs and so as to project out further toward an outer side than end surfaces of the impact absorbing members for a vehicle;

inserting the end portions of the impact absorbing members for a vehicle, at which the mounting members are temporarily held, into interiors of side members that are formed in shapes of hollow tubes; and mounting the impact absorbing members for a vehicle to the side members by inserting first fastening members through pairs of first insert-through holes provided in the side members, the pairs of first through-holes and interiors of the first tubular portions, and fastening the first fastening members, and inserting second fastening members through pairs of second insert-through holes provided in the side members, the pairs of second through-holes and interiors of the second tubular portions, and fastening the second fastening members.

6. The method of manufacturing a vehicle of claim 5, wherein temporarily holding includes causing the reinforcing ribs to be nipped by projecting portions that are formed integrally with reinforcing rib side surfaces of the vertical wall portions and that extend in a vehicle transverse direction, and by first joining portions, second joining portions, or a combination thereof, that join the vertical wall portions and the first tubular portions and the second tubular portions respectively.

* * * * *